United States Patent [19]

Starner

[11] Patent Number: 5,591,812

[45] Date of Patent: Jan. 7, 1997

[54] REACTIVE ACCELERATORS FOR AMINE CURED EPOXY RESINS

[75] Inventor: William E. Starner, Nesquehoning, Pa.

[73] Assignee: Air Products and Chemicals, Inc., Allentown, Pa.

[21] Appl. No.: 592,094

[22] Filed: Jan. 26, 1996

[51] Int. Cl.⁶ .......................... C08G 59/56; C08G 59/50
[52] U.S. Cl. .......................... 525/526; 528/111; 528/120; 528/121; 528/122; 528/123; 528/124; 528/407; 564/325; 252/182.26
[58] Field of Search .......................... 564/325; 528/111, 528/120, 121, 122, 123, 124, 407; 525/526

[56] References Cited

U.S. PATENT DOCUMENTS

| | | | |
|---|---|---|---|
| 2,723,241 | 11/1955 | De Groote et al. | 252/344 |
| 5,091,474 | 2/1992 | Murakami et al. | 525/109 |

FOREIGN PATENT DOCUMENTS

| | | |
|---|---|---|
| 60-231734 | 11/1985 | Japan . |
| 60-231723 | 11/1985 | Japan . |
| 61-143419 | 7/1986 | Japan . |
| 62-153317 | 7/1987 | Japan . |
| 63-148663 | 6/1988 | Japan . |
| 08080423 | 3/1989 | Japan . |
| 01080422 | 3/1989 | Japan . |

OTHER PUBLICATIONS

Lee and Neville, "Handbook of Epoxy Resins", McGraw Hill (1967).

Primary Examiner—Frederick Krass
Attorney, Agent, or Firm—Michael Leach

[57] ABSTRACT

A curable epoxy resin composition comprising a polyepoxide resin and an amine curative characterized in that the amine curative comprises (a) the reaction product of excess monomethylamine (MMA) and an aliphatic or cycloaliphatic polyglycidyl ether and (b) an amine curative. When a diglycidyl ether is used in the reaction the resulting product can be described by the following structure:

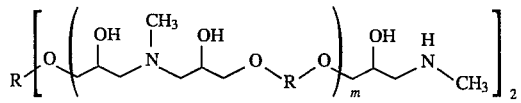

where R is an aliphatic, cycloaliphatic or aromatic organic radical and m is 0–3.

20 Claims, No Drawings

REACTIVE ACCELERATORS FOR AMINE CURED EPOXY RESINS

TECHNICAL FIELD OF THE INVENTION

The present invention relates to amine adducts useful as accelerators for curing agents for epoxy resin systems.

BACKGROUND OF THE INVENTION

Epoxy resin systems that cure at ambient or low temperatures are highly desired by the coatings and adhesives industries. Such systems allow application and repair to occur under a wider range of conditions and extend the working season for many construction and repair operations.

The epoxy industry is in need of highly reactive amine curative compositions to enhance the rate of cure for the ambient and subambient curing of epoxy formulations for civil engineering, coating and paint applications. Polyacrylates are often incorporated into the epoxy formulation to enhance the rate of cure for ambient and subambient applications. Often mercaptans are used for very rapid cures in these formulations.

The use of alcohols and acids to accelerate the cure times of ambient and subambient cured epoxy formulations is well documented in the prior art. A good reference on this subject is Lee and Neville, "Handbook of Epoxy Resins," McGraw Hill (1967). Alcohols such as phenol, nonyl phenol, benzyl alcohol and furfurol are currently used by the epoxy industry to accelerate the curing process with commonly used amines and amine adducts. Although alcohols do accelerate the epoxy/amine reaction they can exude from the polymer detrimentally affecting the environment. As the alcohol migrates from the cured epoxy polymer the physical properties of that polymer change making them ineffective for the desired use. They also act as plasticizers to the epoxy matrix reducing the chemical resistance of the resulting cured epoxy polymer.

Other currently used accelerators include tertiary amines such as tri(dimethylaminomethyl)phenol and acids such as salicylic acid, toluenesulfonic acid and boron trifluoride. These accelerators, however, only moderately increase the cure rate of ambient and subambient cured epoxy formulations. They are fugitive, can effect the environment but do not plasticize the resulting cured epoxy formulation.

These approaches suffer from a variety of defects in that they utilize reagents that are either highly toxic, corrosive, or not wholly compatible with the rest of the epoxy formulation, thus affecting the final physical properties. A particular problem exists with the use of phenol as an accelerator, since it is highly corrosive to skin and is coming under increasing regulatory pressure.

In summary, alcohols and acids are limited in their effect on cure rate or on the physical or chemical properties of the resulting cured epoxy formulation.

Adducts from amines and mono- and diepoxides have long been used in the epoxy industry as curing agents and variants have been reported wherein excess amine is stripped from the product. The advantages of the formation of such adducts include lower volatility, reduced tendency to blush and exude, and less irritation potential. These adducts are also discussed at length in Lee and Neville, "Handbook of Epoxy Resins," McGraw Hill (1967).

JP01080423 and JP01080422 describe the preparation of a gas separation membrane by reacting equimolar amounts of an aliphatic or alicyclic diepoxide with a primary monoamine having two active hydrogens as a hardener. The resulting polymer exhibits selectivity for oxygen separation from air.

JP63148663 describes an epoxy resin composition comprised of a novolak phenol resin, a novolak epoxy resin and a primary monoamine compound used to seal a semiconductor device. The three reactants are blended in the proper equivalent amounts to generate a polymer upon heating.

JP60231723; JP62153317; JP61143419 and JP60231734 describe an additive, hydroxyalkyl amine, and the use of that additive in epoxy resin compositions. The additives are expressed by the following formula:

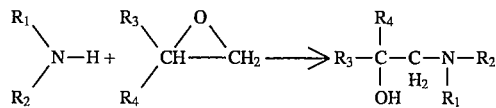

(where R1, R2, R3, and R4 are each a hydrogen, a C1 to C17 saturated or unsaturated aliphatic, alicyclic, aromatic or heterocyclic group, or a heterocyclic residue from which the nitrogen to which R1, R2, R3, and R4 are bonded has been removed; each of these groups may substituted with a halogen group, a nitro group, an alkoxy group, an allyloxy group, or an acetyl group; and R1, R2, R3, and R4 may be the same or different). The stoichiometry between epoxy groups and NH groups used to prepare the hydroxy alkyl amine of this invention may be between 1/10 and 10/1, but it is preferable to use a range of 1/1.5 to 1.5/1. The patent teaches the use of these materials to increase the rigidity of an epoxy resin without markedly sacrificing the elongation. Both primary and secondary amines are employed in the teachings of this patent.

U.S. application Ser. No. 08/582,782, filed 4 Jan. 1996 entitled "Fast Cure Amines For Ambient And Subambient Cure Of Epoxy Resins", discloses an amine curative composition for epoxy resins consisting essentially of the reaction product of monomethylamine and a polyglycidyl ether reacted in a ratio of >2 moles of monomethylamine per equivalent of epoxide and containing a maximum of 25 eq % tertiary amine.

SUMMARY OF THE INVENTION

The present invention provides N-methylamine adducts of polyglycidyl ethers as accelerators for curing agents, or hardeners, in epoxy systems, especially for ambient and subambient curing of epoxy systems, and also provides curable epoxy compositions comprising a blend of such adduct accelerators, curing agent and a polyepoxide resin. Curing is effected by the use of standard procedures in the art.

The N-methylamine adducts of polyglycidyl ethers according to the invention comprise the reaction product of a polyglycidyl ether, preferably a diglycidyl ether, and excess monomethylamine (MMA) as described by the following reaction:

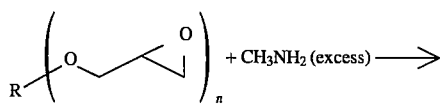

N-methylamine adducts wherein R is an aliphatic, cycloaliphatic or aromatic organic radical and n is 2–4, preferably 2. The adducts are prepared by the reaction of the polyglycidyl ether with an excess of MMA in order to minimize the formation of oligomers and tertiary amines that would otherwise result from the reaction of an MMA adduct with another molecule of polyglycidyl ether. Accordingly, the maximum amount of tertiary amine in useful reaction products is about 25 equivalent% (25 eq %), i.e., the tertiary amine content in the adduct composition should not be greater than 25 eq % of the total amine content.

Thus the invention advantageously provides a novel reactive MMA adduct of a polyglycidyl ether for accelerating the reaction of other amine curing agents with epoxy resins, in particular, the ambient and subambient curing of epoxy resins. The adducts contain methylated secondary amines which are highly reactive in epoxy formulations and alcohol functionalities which are accelerators for the reaction of amine curatives with epoxy resins.

The invention provides the epoxy market with an epoxy/amine reaction accelerator which will react into the epoxy matrix eliminating any environmental issues associated with the use of fugitive accelerators such as phenols and alcohols.

An excess of MMA is employed to minimize the formation of oligomers resulting from the reaction of the MMA adduct with another molecule of polyglycidyl ether. The formation of oligomers introduces tertiary amine into the reaction product (as shown above and below) reducing the effectiveness of the reaction product as an accelerator for amine curatives for epoxies. A second purpose of this invention is to provide a process which minimizes the formation of oligomers and tertiary amine content. Of the total amine content, the maximum amount of tertiary amine in the adduct accelerator should be ~25 %, preferably ~10% maximum.

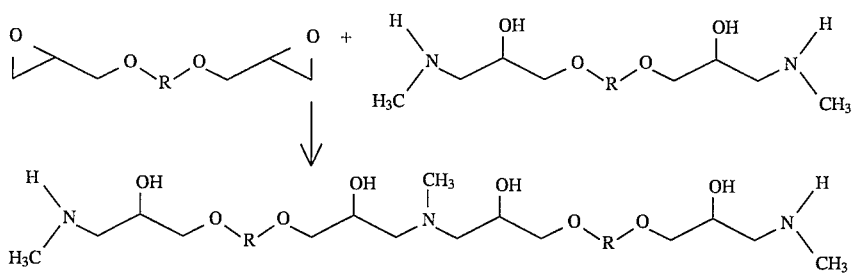

DETAILED DESCRIPTION OF THE INVENTION

According to the invention, the N-methylamine adducts of polyglycidyl ethers are prepared by the reaction of a polyglycidyl ether, preferably a diglycidyl ether, with an excess of MMA as described by the following reaction:

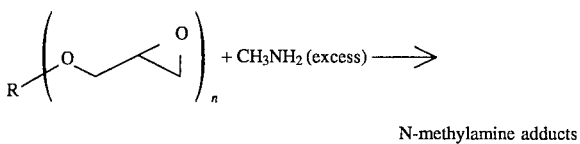

N-methylamine adducts in which R is an aliphatic, cycloaliphatic or aromatic organic radical and n is 2–4. It is desirable that R be a $C_2$–$C_6$ aliphatic, $C_5$–$C_6$ cycloaliphatic or aromatic radical such as, for example, radicals of ethylene glycol, 1,4-butanediol, 1,6-hexanediol, neopentyl glycol, cyclohexane dimethanol, bisphenol A, bisphenol F and trimethylolpropane.

When a diglycidyl ether is reacted with excess MMA, the resulting N-methylamine adducts would be represented by the following structure:

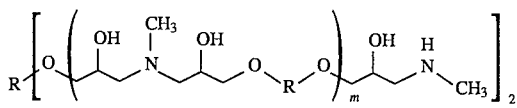

where R is as defined above and m is 0–3, preferably 0–1, and most desirably about 0. The value of m can be determined by measuring the equivalents of tertiary amine present in the composition.

To minimize the formation of oligomers, the amount of MMA used in the reaction should be >2 moles of MMA for every equivalent of epoxide; for example, since a diglycidyl ether contains 2 equivalents of epoxide per molecule, then >4 moles of MMA should be employed for every mole of diglycidyl ether. Although any excess of MMA may be used, >2 to 20 moles of MMA should be used for every equivalent of epoxide in the polyglycidyl ether, preferably 2.5 to 8 moles MMA/epoxide equivalent. The most preferred ratio of moles of MMA to equivalents of epoxide is ~5:1.

Unreacted MMA should be removed from the reaction product, preferably to less than 1 wt %, especially <0.1 wt%. The unreacted MMA may be removed by vacuum distillation.

Any polyglycidyl ether may used in the synthesis of the MMA adduct. These materials include but are not limited to the diglydicyl ethers of ethylene glycol, 1,4-butanediol, 1,6-hexanediol, neopentyl glycol and cyclohexane dimethanol, the triglycidyl ether of trimethylolpropane or trimethylolethane and the diglycidyl ethers of bisphenol A and bisphenol F.

The order of addition of the reactants for making the adducts is dependent on the temperature at which the reaction is conducted. If the reaction temperature is adequately low, for example less that 35° C., the order of addition is not critical because of the slower reaction rate of MMA with the polyglycidyl ether. At 35° C. approximately 4 hours of mixing are necessary to react all the available epoxide groups. If the reaction is carried out above about 35° C., the MMA must be charged to the reactor first. Once the MMA is in the reaction vessel the polyglycidyl ether is charged slowly to control the heat generation of the reaction. If the addition rate is too fast, the reaction temperature will rise. This temperature rise is not detrimental to the product but may be a reaction control problem from an engineering standpoint. At elevated temperatures, the addition of MMA to the polyglycidyl ether should be avoided because this will lead to the formation of oligomeric and polymeric materials increasing the tertiary amine content in the final product.

The completion point of the reaction is determined by the absence of epoxide bands in the IR at 914, 840 and 755 cm$^{-1}$. When these IR bands are gone all the epoxide groups have been consumed by the MMA. If the reaction is stopped while epoxide groups are still present and the excess, unreacted MMA removed, oligomers will be formed from the reaction of the unreacted epoxide groups with the monomethylaminated reaction product increasing the tertiary amine content in the final product.

The reaction is normally conducted without the use of a solvent. However, any solvent may be used in which both reactants and the product are soluble. Suitable solvents include alcohols such as methanol or ethanol and ethers such as diethyl ether or tetrahydrofuran. Solvents such as water, in which the diglycidyl ether is not soluble, are not suitable for the reaction because their use will lead to the production of oligomeric products. The preferred method is not to use a solvent for the reaction in order to minimize the number of process steps. However, the use of an alcohol such as methanol for the reaction solvent has been found to catalyze the reaction of MMA with the epoxide reducing the reaction time.

The reaction may be conducted at any temperature practical for the equipment being used. As MMA is a gas at room temperature, the equipment used must be able to withstand the pressure exerted by MMA at the chosen reaction conditions, i.e., the autogenous pressure. Thus the reaction should be conducted in a vessel capable of handling the pressure exerted by MMA at the desired reaction temperature. The typical temperature range for this reaction is from 0° C. to 100° C. and the preferred temperature range is from 50° C. to 70° C. Lower temperatures result in longer reaction times and higher temperatures require higher pressure equipment to contain the pressure exerted by MMA vapor.

MMA adducts of polyglycidyl ethers prepared in this fashion significantly accelerate the cure of an epoxy/hardener composition. Higher alkylamine adducts, such as the monoethylamine (MEA) adduct, of a polyglycidyl ether only slightly exhibit an acceleration effect on an epoxy/hardener composition due to the steric hindrance effect of the higher alkyl group bonded to the nitrogen atom.

When using the MMA adduct as a reactive accelerator with another amine curative, the amount of MMA adduct employed should be within the range of about 0.02 to 0.99 equivalents of MMA adduct per equivalent of epoxy groups present in the epoxy resin. The remainder needed for a 1:1 stoichiometry of amine to epoxy comprises the amine curative of choice, i.e., 0.01 to 0.98 equivalents of amine curative per equivalent of epoxy groups present in the epoxy resin. Preferably 0.1 to 0.25 equivalents of MMA adduct and 0.75 to 0.9 equivalents of amine curative per equivalent of epoxy groups are used. The adduct accelerators may be used individually, or in combination, as their reaction mixtures.

Any amine curing agents and hardeners well known in the art may be used in conjunction with an MMA adduct accelerator. Thus any amine curative typically used for curing epoxy resins may be used as a co-curative with the MMA adduct accelerators. Such amine curatives include polyalkyleneamines, amidoamines, polyamides, amine adducts and cyclic diamines such as isophorone diamine, m-xylylene diamine, and methylene biscyclohexaneamine.

The combination of MMA accelerators and amine curing agents, or hardeners, according to this invention are useful in applications requiring a relatively thin film of cured epoxy resin, such as coatings and adhesives. They are used to cure resins or mixtures of resins containing epoxy groups. The epoxy resins or epoxy resin mixture may be liquid or solid in nature and have an epoxide equivalent weight (EEW) based on solids of from about 150 to about 1,000, preferably from about 156 to about 700. Usually the resin mixture will consist of di- or polyepoxide resins, such as those resins listed below. The epoxy resin mixture may be modified with a portion of monofunctional epoxides.

The polyepoxy resin component of the curable epoxy composition can be any polyepoxide containing about 2 or more epoxy groups per molecule. Such epoxides are described in Y. Tanaka, "Synthesis and Characteristics of Epoxides," in C. A. May, ed., *Epoxy Resins Chemistry and Technology* (Marcel Dekker, 1988). Examples include epoxides of polyunsaturated organic compounds, oligomers of epihalohydrins, glycidyl derivatives of hydantoin and hydantoin derivatives, glycidyl ethers of polyvalent alcohols, glycidyl derivatives of triazines, and glycidyl ethers of dihydric phenols. Epoxides of polyunsaturated organic compounds include divinyl benzene, cyclohexadiene, cyclooctadiene, dicyclopentadiene, cyclododecadiene, cyclododecatriene, isoprene, 1,5-hexadiene, butadiene, polybutadiene, polyisoprene, and the like. Glycidyl ethers of polyvalent alcohols include glycidyl ethers of neopentyl, ethylene, propylene, and butylene glycol, trimethylolpropane, 2-ethyl-1,3-hexanediol, 2,2-diethyl-1,3-propanediol, 2-butyl-2-ethyl-1,3-propanediol, 1,6-hexanediol, 1,4-butanediol, 1,3-propanediol, 1,5-pentanediol, 1,8-octanediol, 1,10-decanediol, 1,12-dodcecanediol, 1,2-cyclohexanediol, 1,4-cyclohexanediol, 1,4-cyclohexane dimethanol, glycerin, sorbitol, pentaerythritol, and the like. Glycidyl ethers of polymeric polyvalent alcohols are also suitable and include the glycidyl ethers of polyethylene glycol, polypropylene glycol, polybutylene glycol, the various copolymers of ethylene, propylene, and butylene oxides, polyvinyl alcohol, polyallyl alcohol, and the like. The glycidyl derivatives include triglycidyl isocyanurate.

The glycidyl derivatives of hydantoin and hydantoin derivatives include structures shown below where R1 and R2 are alkyl chains of 1 to 4 carbons, or R1 and R2 represent a single tetramethylene or pentamethylene chain.

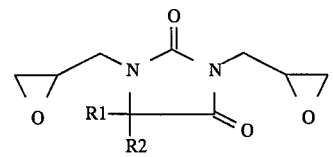

Glycidyl ethers of polyhydric phenols include the glycidyl ethers of dihydric phenols, including resorcinol, hydroquinone, bis-(4-hydroxy-3,5-difluorophenyl)-methane, 1,1-bis-(4-hydroxyphenyl)-ethane, 2,2-bis-(4-hydroxy-3-methylphenyl)-propane, 2,2-bis(4-hydroxy-3,5-dichlorophenyl) propane, 2,2-bis-(4-hydroxyphenyl)-propane (more commonly known as bisphenol A), and bis-(4-hydroxyphenyl)-methane (more commonly known as bisphenol F, and which may contain varying amounts of 2-hydroxyphenyl isomers), and the like. Also useful are the advanced dihydric phenols of the following structure:

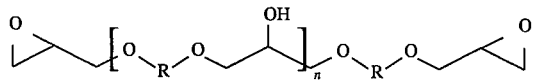

where n is an integer, and R is a divalent hydrocarbon radical of a dihydric phenol, such as the dihydric phenols listed above. Such materials are prepared by polymerizing mixtures of the dihydric phenol and epichlorohydrin, or by advancing a mixture of the diglycidyl ether of the dihydric phenol and the dihydric phenol. While in any given molecule the value of n is an integer, the materials are invariably mixtures which can be characterized by an average value of n which is not necessarily a whole number. Useful in this invention are polymers with a value of n between 0 and about 7. Also useful in this invention are the epoxy novolac resins, which are the glycidyl ethers of novolac resins. Novolac resins are the reaction product of a mono or dialdehyde, most usually formaldehyde, with a mono or polyphenolic material. Examples of monophenolic materials which may be utilized include phenol, the cresols, p-tert-butylphenol, nonylphenol, octylphenol, other alkyl and phenyl substituted phenols, and the like. Polyphenolic materials include the various diphenols including bisphenol-A and the like. Aldehydes which are utilized for the novolac include formaldehyde, glyoxal, and the higher aldehydes up to about $C_4$. The novolacs typically are complex mixtures with different degrees of hydroxyl functionality. For the purposes of this invention useful functionalities range from about 2 to about 4

The preferred polyepoxy compounds are the diglycidyl ethers of bisphenol-A and bisphenol-F, advanced bisphenol-A resins where n is between about 0.1 and about 3, and epoxy novolacs derived from phenol and formaldehyde with an average functionality of about 2 to about 4. Most preferred are diglycidyl ethers of bisphenol-A and diglycidyl ethers of bisphenol-F.

Normally, epoxy compositions according to this invention will consist of at least two components, one of which contains the epoxy resin, and the other the accelerator and the curing agent. It will usually be advantageous to include one or more organic solvents in one or both components of the coating. The solvents are employed to, for example, reduce the viscosity of the individual or combined components, to reduce the surface tension of the formulation, to aid in coalescence of the ingredients for optimum film formation, to increase pot life, and to increase the stability of one or both components. Particularly useful solvents are the lower molecular weight glycol ethers such as ethylene glycol monopropyl ether, ethylene glycol monobutyl ether, ethylene glycol monoethyl ether, propylene glycol monomethyl ether, propylene glycol monoethyl ether, diethylene glycol monobutyl ether, and the like. Other useful solvents include the aromatic solvents such as xylene and aromatic solvent blends such as Aromatic 100, ketones such as methyl ethyl ketone, methyl isobutyl ketone, esters such as butyl acetate, and alcohols such as isopropyl alcohol and butanol.

It will frequently be advantageous to include plasticizers such as benzyl alcohol, phenol, tert-butylphenol, nonylphenol, octylphenol, and the like in one or both of the components. Plasticizers reduce the glass transition temperature of the composition and therefore allow the amine and epoxide to achieve a higher degree of reaction than might otherwise be possible. Other accelerators for the epoxy/amine reaction may be employed in the formulation but are not believed necessary because of the effectiveness of the MMA adduct accelerators. Other useful accelerators are well known to those skilled in the art and include acids such as salicylic acid, various phenols, Various carboxylic acids, and various sulfonic acids, and tertiary amines such as tris(dimethylaminomethyl)phenol.

The coating formulation may also include pigments and mixtures of pigments. The pigments may be ground into the epoxy resin, the hardener, or both. They may also be incorporated with the use of a pigment grinding aid or pigment dispersant, which may be used in combination with the epoxy resin or the hardener, or may be used alone. The use of pigment dispersants is well known to those skilled in the art of coating formulation.

Other additives may also be included in the coatings formulation. Such additives include defoamers, surfactants, slip and mar aids, rheology modifiers, flow aids, adhesion promoters, light and heat stabilizers, corrosion inhibitors, and the like.

Thus, the combination of MMA adduct accelerators and amine curatives, according to the present invention, provide for epoxy resin systems that cure at ambient or low temperatures, i.e., 30° C. or below, especially 0° to 30° C., which are highly desired by the coatings and adhesive industries. Such systems allow application and repair to occur under a wider range of conditions and extend the working season for many construction and repair operations.

In the following examples the tertiary amine content was determined by treating the curing agents with an excess of acetic acid anhydride in anhydrous acetic acid to convert the secondary amine to an amide. The unreacted tertiary amine was then determined by titration with perchloric acid in anhydrous acetic acid. The secondary amine was then obtained by subtracting the tertiary amine value as determined from the total amine value obtained by titration without acetic anhydride reaction.

EXAMPLE 1

A 2.0 liter autoclave was charged with 610 g of MMA (19.7 moles). The temperature was maintained at room temperature. With agitation, 520 g of Epodil® 749 epoxide (neopentyl glycol diglycidyl ether; 1.88 moles) was added slowly over a 30 minute period. No temperature increase was observed during the addition. After addition was complete the reaction mixture was agitated for 30 minutes. The reaction was complete when the IR bands for the epoxy group at 914, 840 and 755 $cm^{-1}$ were no longer present. The unreacted MMA was then removed from the reaction mixture by venting to a collection vessel. Residual MMA was removed from the product by reduced pressure distillation. 624.1 g of the MMA adduct of the diglycidyl ether of neopentyl glycol was obtained (98% of theory). The product had a total amine value of 293.7 mg KOH/g, tertiary amine content of 2.8 eq %, an N-H equivalent weight of 196 and a viscosity of 39.4 Pa-s. This product will be identified as 749MMA in following examples.

EXAMPLE 2

A 2.0 liter autoclave was charged with 610 g of MMA (19.7 moles). The temperature was maintained at room temperature. With agitation, 520 g of Epodil 750 epoxide (1,4-butanediol diglycidyl ether; 2.0 moles) was added slowly over a 30 minute period. No temperature increase was observed during the addition. After addition was complete the reaction mixture was agitated for 30 minutes. The reaction was complete when the I R bands for the epoxy group at 914, 840 and 755 $cm^{-1}$ were no longer present. The unreacted MMA was then removed from the reaction mixture by venting to a collection vessel. Residual MMA was removed from the product by reduced pressure distillation. 608.3 g of the MMA adduct of the diglycidyl ether of 1,4-butanediol was obtained (97.5% of theory). The product had a total amine value of 322.4 mg KOH/g, tertiary amine content of 4.6 eq %, an N-H equivalent weight of 182 and a viscosity of 10.8 Pa-s. This product will be identified as 750 MMA in the following examples.

EXAMPLE 3

A 2.0 liter autoclave was charged with 610 g of MMA (19.7 moles). The temperature was maintained at room temperature. With agitation, 520 g of Epodil 757 epoxide (cyclohexane dimethanol diglycidyl ether; 1.625 moles) was added slowly over a 30 minute period. No temperature increase was observed during the addition. After addition was complete, the reaction mixture was agitated for 30 minutes. The reaction was complete when the IR bands for the epoxy group at 914, 840 and 755 cm$^{-1}$ were no longer present. The unreacted MMA was then removed from the reaction mixture by venting to a collection vessel. Residual MMA was removed from the product by reduced pressure distillation. 608.3 g of the MMA adduct of the diglycidyl ether of cyclohexane dimethanol was obtained (98% of theory). The product had an total amine value of 262.1 mg KOH/g, an N-H equivalent weight of 225 and a viscosity of 88.4 Pa-s. This product will be identified as 757 MMA in the following examples.

EXAMPLE 4

A 0.15 liter autoclave was charged with 31.5 g of MMA (1.0 moles). The temperature was maintained at 50° C. With agitation, 28.7 g of trimethylolpropane triglycidyl ether (0.068 moles; 0.2 eq) was added slowly at 0.5 g/min. No temperature increase was observed during the addition. After addition was complete, the reaction mixture was agitated for 30 minutes. The reaction was complete when the IR bands for the epoxy group at 914, 840 and 755 cm$^{-1}$ were no longer present. The unreacted MMA was then removed from the reaction mixture by venting to a collection vessel. Residual MMA was removed from the product by reduced pressure distillation. 33.1 g of the MMA adduct of the triglycidyl ether of trimethylolpropane was obtained (95% of theory). The product had a total amine value of 289.0 mg KOH/g and an N-H equivalent weight of 266.5. This product will be identified as TMPTGEMMA in following examples.

EXAMPLE 5

A 2.0 liter autoclave was charged with 443.2 g of monoethylamine (9.85 moles). The temperature was maintained at room temperature. With agitation, 260 g of Epodil 749 epoxide (neopentyl glycol diglycidyl ether; 0.94 moles) was added slowly over a 30 minute period. No temperature increase was observed during the addition. After addition was complete, the reaction mixture was agitated for 30 minutes. The reaction was complete when the IR bands for the epoxy group at 914, 840 and 755 cm$^{-1}$ were no longer present. The unreacted monoethylamine (MEA) was then removed from the reaction mixture by venting to a collection vessel. Residual MEA was removed from the product by reduced pressure distillation. 298.9 g of the MEA adduct of the diglycidyl ether of neopentyl glycol was obtained (98% of theory). The product had a total amine value of 271 mg KOH/g, an N-H equivalent weight of 216 and a viscosity of 1000 Pa-s. This product will be identified as 749MEA in following examples.

EXAMPLES 6–10

Examples 6–10 show how gel times of Epon® 828 epoxide resin (diglycidyl ether of bisphenol A) cured with aminoethylpiperazine (AEP) were affected by the presence of varying levels of 749MMA (Example 1). A stoichiometric amount of curative based on the amine hydrogen equivalent weight of the combined curatives was used per equivalent of Epon 828 resin. The data in Table 1 show that the presence of 749MMA in an Epon 828/AEP formulation significantly lowered the gel time of the mixture.

TABLE 1

| Ex | AEP (Eq per Eq resin) | 749MMA (Eq per Eq resin) | AEP (g) | 749MMA (g) | Epon 828 (g) | Gel Time (min) |
|---|---|---|---|---|---|---|
| 6 | 0.0 | 1.0 | 0.0 | 25.4 | 25.0 | 11.5 |
| 7 | 0.5 | 0.5 | 3.4 | 15.2 | 30.0 | 6.6 |
| 8 | 0.75 | 0.25 | 6.0 | 8.9 | 35.0 | 6.8 |
| 9 | 0.875 | 0.125 | 8.0 | 5.1 | 40.0 | 9.2 |
| 10 | 1.0 | 0.0 | 9.2 | 0.0 | 40.0 | 25.0 |

COMPARATIVE EXAMPLES 11–15

Examples 11–15 show how gel times of Epon 828 epoxy resin cured with aminoethylpiperazine (AEP) were affected by the presence of varying levels of 749MEA (Example 5). A stoichiometric amount of curative based on the amine hydrogen equivalent weight of the combined curatives was used per equivalent of Epon 828 resin. The data in Table 2 show that the presence of 749MEA in an Epon 828/AEP formulation only slightly lowered the gel time of the mixture.

TABLE 2

| Ex | AEP (Eq per Eq resin) | 749MEA (Eq per Eq resin) | AEP (g) | 749MEA (g) | Epon 828 (g) | Gel Time (min) |
|---|---|---|---|---|---|---|
| 11 | 0.0 | 1.0 | 0.0 | 27.5 | 25.0 | 82.5 |
| 12 | 0.5 | 0.5 | 3.4 | 16.5 | 30.0 | 38.5 |
| 13 | 0.75 | 0.25 | 6.0 | 9.6 | 35.0 | 19.5 |
| 14 | 0.875 | 0.125 | 8.0 | 5.5 | 40.0 | 17.5 |
| 15 | 1.0 | 0.0 | 9.2 | 0.0 | 40.0 | 25.0 |

EXAMPLES 16–20

Examples 16–20 show how gel times of Epon 828 epoxy resin cured with aminoethylpiperazine (AEP) were affected by the presence of varying levels of 750MMA (Example 2). A stoichiometric amount of curative based on the amine hydrogen equivalent weight of the combined curatives was used per equivalent of Epon 828 resin. The data in Table 3 show that the presence of 750MMA in an Epon 828/AEP formulation significantly lowered the gel time of the mixture.

TABLE 3

| Ex | AEP (Eq per Eq resin) | 750MMA (Eq per Eq resin) | AEP (g) | 750MMA (g) | Epon 828 (g) | Gel Time (min) |
|---|---|---|---|---|---|---|
| 16 | 0.0 | 1.0 | 0.0 | 27.0 | 25.0 | 11.2 |
| 17 | 0.5 | 0.5 | 3.4 | 16.4 | 30.0 | 9.0 |
| 18 | 0.75 | 0.25 | 6.0 | 9.6 | 35.0 | 10.0 |
| 19 | 0.875 | 0.125 | 8.0 | 5.5 | 40.0 | 12.0 |
| 20 | 1.0 | 0.0 | 9.2 | 0.0 | 40.0 | 25.0 |

EXAMPLES 21–25

Examples 21–25 show how gel times of Epon 828 epoxy resin cured with aminoethylpiperazine (AEP) were affected by the presence of varying levels of 757MMA (Example 3). A stoichiometric amount of curative based on the amine hydrogen equivalent weight of the combined curatives was used per equivalent of Epon 828 resin. The data in Table 4 show that the presence of 757MMA in an Epon 828/AEP formulation significantly lowered the gel time of the mixture.

TABLE 4

| Ex | AEP (Eq per Eq resin) | 757MMA (Eq per Eq resin) | AEP (g) | 757MMA (g) | Epon 828 (g) | Gel Time (min) |
|---|---|---|---|---|---|---|
| 21 | 0.0 | 1.0 | 0.0 | 28.4 | 25.0 | 9.3 |
| 22 | 0.5 | 0.5 | 3.4 | 17.1 | 30.0 | 8.5 |
| 23 | 0.75 | 0.25 | 6.0 | 9.9 | 35.0 | 10.1 |
| 24 | 0.875 | 0.125 | 8.0 | 5.7 | 40.0 | 13.0 |
| 25 | 1.0 | 0.0 | 9.2 | 0.0 | 40.0 | 25.0 |

EXAMPLES 26–30

Examples 26–30 show how gel times of Epon 828 epoxy resin cured with methylene bis(4-aminocyclohexane) [PACM] were affected by the presence of varying levels of 749MMA (Example 1). A stoichiometric amount of curative based on the amine hydrogen equivalent weight of the combined curatives was used per equivalent of Epon 828 resin. The data in Table 5 show that the presence of 749MMA in an Epon 828/PACM formulation significantly lowered the gel time of the mixture.

TABLE 5

| Ex | PACM (Eq per Eq resin) | 749MMA (Eq per Eq resin) | PACM (g) | 749MMA (g) | Epon 828 (g) | Gel Time (min) |
|---|---|---|---|---|---|---|
| 26 | 0.0 | 1.0 | 0.0 | 25.4 | 25.0 | 11.5 |
| 27 | 0.5 | 0.5 | 4.6 | 13.7 | 33.0 | 9.6 |
| 28 | 0.75 | 0.25 | 7.2 | 8.6 | 34.0 | 22.6 |
| 29 | 0.875 | 0.125 | 9.8 | 5.1 | 40.0 | 60.4 |
| 30 | 1.0 | 0.0 | 11.2 | 0.0 | 40.0 | 163.1 |

EXAMPLES 31–35

Examples 31–35 show how gel times of Epon 828 epoxy resin cured with methylene bis(4-aminocyclohexane) [PACM] were affected by the presence of varying levels of 750MMA (Example 2). A stoichiometric amount of curative based on the amine hydrogen equivalent weight of the combined curatives was used per equivalent of Epon 828 resin. The data in Table 6 show that the presence of 750MMA in an Epon 828/PACM formulation significantly lowered the gel time of the mixture.

TABLE 6

| Ex | PACM (Eq per Eq resin) | 750MMA (Eq per Eq resin) | PACM (g) | 750MMA (g) | Epon 828 (g) | Gel Time (min) |
|---|---|---|---|---|---|---|
| 31 | 0.0 | 1.0 | 0.0 | 27.0 | 25.0 | 11.2 |
| 32 | 0.5 | 0.5 | 4.6 | 14.8 | 33.0 | 14.6 |
| 33 | 0.75 | 0.25 | 7.2 | 9.3 | 34.0 | 24.2 |
| 34 | 0.875 | 0.125 | 9.8 | 5.5 | 40.0 | 59.5 |
| 35 | 1.0 | 0.0 | 11.2 | 0.0 | 40.0 | 163.1 |

EXAMPLES 36–40

Examples 36–40 show how gel times of Epon 828 epoxy resin cured with methylene bis(4-aminocyclohexane) [PACM] were affected by the presence of varying levels of 757MMA (Example 3). A stoichiometric amount of curative based on the amine hydrogen equivalent weight of the combined curatives was used per equivalent of Epon 828 resin. The data in Table 7 show that the presence of 757MMA in an Epon 828/PACM formulation significantly lowered the gel time of the mixture.

TABLE 7

| Ex | PACM (Eq per Eq resin) | 757MMA (Eq per Eq resin) | PACM (g) | 757MMA (g) | Epon 828 (g) | Gel Time (min) |
|---|---|---|---|---|---|---|
| 36 | 0.0 | 1.0 | 0.0 | 28.4 | 25.0 | 9.3 |
| 37 | 0.5 | 0.5 | 4.2 | 17.1 | 30.0 | 13.0 |
| 38 | 0.75 | 0.25 | 7.3 | 9.9 | 35.0 | 24.4 |
| 39 | 0.875 | 0.125 | 9.8 | 5.7 | 40.0 | 48.9 |
| 40 | 1.0 | 0.0 | 11.2 | 0.0 | 40.0 | 163.3 |

COMPARATIVE EXAMPLES 41–45

Examples 41–45 show how gel times of Epon 828 epoxy resin cured with methylene bis(4-aminocyclohexane) [PACM] were affected by the presence of varying levels of N,N'-dimethyl-1,3-propanediamine (DMPDA), a curative which is similar in structure to the MMA adducts but does not contain alcohol functionality. A stoichiometric amount of curative based on the amine hydrogen equivalent weight of the combined curatives was used per equivalent of Epon 828 resin. The data in Table 8 show how the presence of DMPDA in an Epon 828/PACM formulation affected the gel time of the mixture.

TABLE 8

| Ex | PACM (Eq per Eq resin) | DMPDA (Eq per Eq resin) | PACM (g) | DMPDA (g) | Epon 828 (g) | Gel Time (min) |
|---|---|---|---|---|---|---|
| 41 | 0.0 | 1.0 | 0.0 | 10.9 | 40.0 | 25.0 |
| 42 | 0.5 | 0.5 | 5.6 | 5.4 | 40.0 | 27.6 |
| 43 | 0.75 | 0.25 | 8.3 | 2.7 | 40.0 | 55.6 |
| 44 | 0.875 | 0.125 | 9.8 | 1.4 | 40.0 | 103.7 |
| 45 | 1.0 | 0.0 | 11.2 | 0.0 | 40.0 | 163.1 |

EXAMPLES 46–50

Examples 46–50 show how gel times of Epon 828 epoxy resin cured with m-xylylenediamine (MXDA) were affected by the presence of varying levels of 749MMA (Example 1). A stoichiometric amount of curative based on the amine hydrogen equivalent weight of the combined curatives was used per equivalent of Epon 828 resin. The data in Table 9 show that the presence of 749MMA in an Epon 828/MXDA formulation significantly lowered the gel time of the mixture.

TABLE 9

| Ex | MXDA (Eq per Eq resin) | 749MMA (Eq per Eq resin) | MXDA (g) | 749MMA (g) | Epon 828 (g) | Gel Time (min) |
|---|---|---|---|---|---|---|
| 46 | 0.0 | 1.0 | 0.0 | 25.4 | 25.0 | 11.5 |
| 47 | 0.5 | 0.5 | 3.0 | 16.7 | 33.0 | 11.5 |
| 48 | 0.75 | 0.25 | 4.7 | 8.9 | 35.0 | 15.2 |
| 49 | 0.875 | 0.125 | 6.3 | 5.1 | 40.0 | 22.5 |
| 50 | 1.0 | 0.0 | 7.6 | 0.0 | 42.0 | 97.0 |

EXAMPLES 51–54

Examples 51–54 show how gel times of Epon 828 epoxy resin cured with aminoethylpiperazine (AEP) were affected by the presence of varying levels of TMPTGEMMA (Example 4). A stoichiometric amount of curative based on the amine hydrogen equivalent weight of the combined curatives was used per equivalent of Epon 828 resin. The data in Table 10 show that the presence of TMPTGEMMA in an Epon 828/AEP formulation significantly lowered the gel time of the mixture.

TABLE 10

| Ex | AEP (Eq per Eq resin) | TMPTGEMMA (Eq per Eq resin) | AEP (g) | 749MMA (g) | Epon 828 (g) | Gel Time (min) |
|----|----|----|----|----|----|----|
| 51 | 1.0 | 0.0 | 9.2 | 0.0 | 40.0 | 25.0 |
| 52 | 0.875 | 0.125 | 8.0 | 5.3 | 40.0 | 10.0 |
| 53 | 0.75 | 0.25 | 6.0 | 8.2 | 35.0 | 9.5 |
| 54 | 0.5 | 0.5 | 3.4 | 14.0 | 30.0 | 17.6 |

EXAMPLE 55

A 0.15 liter autoclave was charged with 28.7 g of monomethylamine (0.926 moles). The temperature was maintained at 50° C. With agitation, 34.8 g of Epon 828 epoxide resin (0.0926 moles) was added slowly at 0.5 g/min. No temperature increase was observed during the addition. After addition was complete the reaction mixture was agitated for 30 minutes. The reaction was complete when the IR bands for the epoxy group at 914, 840 and 755 cm$^{-1}$ were no longer present. The unreacted MMA was then removed from the reaction mixture by venting to a collection vessel. Residual MMA was removed from the product by reduced pressure distillation. 39.3 g of the MMA adduct of Epon 828 resin was obtained (97% of theory). The product had a total amine value of 237.4 mg KOH/g and an N-H equivalent weight of 236.3. The product will be identified as MMA in the following examples.

EXAMPLES 56–59

Examples 56–59 show how gel times of Epon 828 epoxy resin cured with methylene bis(4-aminocyclohexane) (PACM) were affected by the presence of varying levels of 828MMA (Example 55). A stoichiometric amount of curative based on the amine hydrogen equivalent weight of the combined curatives was used per equivalent of Epon 828 resin. The data in Table 11 show that the presence of 828MMA in an Epon 828/PACM formulation significantly lowered the gel time of the mixture.

TABLE 11

| Ex | PACM (Eq per Eq resin) | 828MMA (Eq per Eq resin) | PACM (g) | 828MMA (g) | Epon 828 (g) | Gel Time (min) |
|----|----|----|----|----|----|----|
| 56 | 0.5 | 0.5 | 2.8 | 12.8 | 20.6 | 13.3 |
| 57 | 0.75 | 0.25 | 7.0 | 10.5 | 34.0 | 25.7 |
| 58 | 0.875 | 0.125 | 9.3 | 6.0 | 38.0 | 57.2 |
| 59 | 1.0 | 0.0 | 11.2 | 0.0 | 40.0 | 163.3 |

The MMA adduct of a polyglycidyl ether contains two functional groups which cause the reactivity enhancement observed with these materials. These functional groups are the N-methyl secondary amine and the alcohol group bound to the adjacent carbon atom. The N-methylated secondary amines are known to be extremely reactive nucleophiles particularly when reacting with epoxides. In fact, they are more reactive than most primary amines. Alcohols are well known accelerators for the reaction of amines with epoxides. The presence of alcohol functionality on the adjacent carbon atom to the N-methyl secondary amine acts as an accelerator and also provides anchimeric assistance to the nucleophilicity of the amine. The alcohol present in the backbone of the molecule, the result of oligomer formation when insufficient MMA is used for the synthesis of the MMA adduct, does not exhibit the same rate enhancing effect. Thus, the amount of oligomer formation or tertiary amine content must be minimized to <25% in order to maximize the amount of both N-methyl secondary amine and the active alcohol functionality.

The present invention requires for the preparation of the N-methylamine adducts >2:1 of moles of MMA to equivalents of epoxide to obtain the accelerating effect when used in combination with an amine curing agent. If the moles MMA to epoxide equivalents ratio is ≤2:1, the resulting reaction product does not exhibit the desired effect. Only the MMA adduct of aliphatic and cycloaliphatic polyglycidyl ethers show the accelerating effect in the invention. Higher alkyl amines both primary and secondary do not exhibit the same effect when used in combination with amine curatives.

STATEMENT OF INDUSTRIAL APPLICATION

The present invention provides MMA adducts of a polyglycidyl ether for use as an accelerator for amine curing agents and hardeners in ambient and subambient temperature cured epoxy systems.

I claim:

1. A curative composition for epoxy resins consisting essentially of (a) 0.02 to 0.99 eq % monomethylamine adduct which is the reaction product of monomethylamine and a polyglycidyl ether reacted in a ratio of >2 moles of monomethylamine per equivalent of epoxide and containing a maximum of 25 eq % tertiary amine and (b) 0.01 to 0.98 eq % amine co-curative for epoxy resins.

2. The curative composition of claim 1 in which the monomethylamine adduct is prepared by reacting >2 to 20 moles of monomethylamine per equivalent of epoxide.

3. The curative composition of claim 1 in which the monomethylamine adduct is prepared by reacting 2.5 to 8 moles of monomethylamine per equivalent of epoxide.

4. The curative composition of claim 1 in which the monomethylamine adduct is prepared by reacting about 5 moles of monomethylamine per equivalent of epoxide.

5. The curative composition of claim 1 in which the polyglycidyl ether is selected from the group consisting of diglydicyl ether of ethylene glycol, diglydicyl ether of 1,4-butanediol, diglydicyl ether of 1,6-hexanediol, diglydicyl ether of neopentyl glycol, diglydicyl ether of cyclohexane dimethanol, diglycidyl ether of bisphenol A, diglycidyl ether of bisphenol F, triglycidyl ether of trimethylolpropane and triglycidyl ether of trimethylolethane.

6. The curative composition of claim 1 which the monomethylamine adduct contains a maximum of 10 eq % tertiary amine.

7. The curative composition of claim 1 in which the unreacted monomethylamine content of the monomethylamine adduct is <1 wt %.

8. The curative composition of claim 1 consisting essentially of (a) 0.1 to 0.25 eq % monomethylamine adduct and (b) 0.75 to 0.9 eq % amine co-curative.

9. A curative composition for epoxy resins consisting essentially of (a) 0.02 to 0.99 eq % monomethylamine adduct which is the reaction product of monomethylamine and a polyglycidyl ether reacted in a ratio of 2.5 to 8 moles of monomethylamine per equivalent of epoxide and containing a maximum of 25 eq % tertiary amine and an unreacted monomethylamine content <1 wt % and (b) 0.01 to 0.98 eq % amine co-curative selected from the group consisting of polyalkyleneamines, amidoamines, polyamides, amine adducts and cyclic diamines.

10. The curative composition of claim 9 in which the polyglycidyl ether is selected from the group consisting of diglydicyl ether of ethylene glycol, diglydicyl ether of 1,4-butanediol, diglydicyl ether of 1,6-hexanediol, diglydicyl ether of neopentyl glycol, diglydicyl ether of cyclohexane dimethanol, diglydicyl ether of bisphenol A, diglycidyl ether of bisphenol F, triglycidyl ether of trimethylolpropane and triglycidyl ether of trimethylolethane.

11. The curative composition of claim 9 in which the monomethylamine adduct contains a maximum of 10 eq % tertiary amine.

12. The curative composition of claim 9 in which the unreacted monomethylamine content of the monomethylamine adduct is <0.1 wt %.

13. The curative composition of claim 9 in which the monomethylamine adduct contains a maximum of 10 eq % tertiary amine and an unreacted monomethylamine content <0.1 wt %, the polyglycidyl ether being selected from the group consisting of diglydicyl ether of ethylene glycol, diglydicyl ether of 1,4-butanediol, diglydicyl ether of 1,6-hexanediol, diglydicyl ether of neopentyl glycol, diglydicyl ether of cyclohexane dimethanol, diglydicyl ether of bisphenol A, diglycidyl ether of bisphenol F, triglycidyl ether of trimethylolpropane and triglycidyl ether of trimethylolethane.

14. The curative composition of claim 13 in which the monomethylamine adduct is prepared by reacting about 5 moles of monomethylamine per equivalent of epoxide.

15. The curative composition of claim 9 consisting essentially of (a) 0.1 to 0.25 eq % monomethylamine adduct and (b) 0.75 to 0.9 eq % amine co-curative.

16. The curative composition of claim 13 consisting essentially of (a) 0.1 to 0.25 eq % monomethylamine adduct and (b) 0.75 to 0.9 eq % amine co-curative.

17. The curative composition of claim 14 consisting essentially of (a) 0.1 to 0.25 eq % monomethylamine adduct and (b) 0.75 to 0.9 eq % amine co-curative.

18. A curable epoxy resin composition comprising a polyepoxide resin and a curative characterized in that the curative comprises the composition of claim 1.

19. A curable epoxy resin composition comprising a polyepoxide resin and a curative characterized in that the curative comprises the composition of claim 9.

20. A curable epoxy resin composition comprising a polyepoxide resin and a curative characterized in that the curative comprises the composition of claim 13.

* * * * *